US011270002B2

(12) United States Patent
Tehranipoor et al.

(10) Patent No.: US 11,270,002 B2
(45) Date of Patent: Mar. 8, 2022

(54) HARDWARE TROJAN DETECTION THROUGH INFORMATION FLOW SECURITY VERIFICATION

(71) Applicant: University of Florida Research Foundation, Inc., Gainesville, FL (US)

(72) Inventors: Mark M. Tehranipoor, Gainesville, FL (US); Adib Nahiyan, Gainesville, FL (US); Domenic J. Forte, Gainesville, FL (US)

(73) Assignee: University Of Florida Research Foundation, Inc., Gainesville, FL (US)

( * ) Notice: Subject to any disclaimer, the term of this patent is extended or adjusted under 35 U.S.C. 154(b) by 252 days.

(21) Appl. No.: 15/978,734

(22) Filed: May 14, 2018

(65) Prior Publication Data
US 2019/0347417 A1 Nov. 14, 2019

(51) Int. Cl.
*G06F 21/56* (2013.01)
*G06F 21/76* (2013.01)
(Continued)

(52) U.S. Cl.
CPC ............ *G06F 21/568* (2013.01); *G06F 21/55* (2013.01); *G06F 21/56* (2013.01); *G06F 21/565* (2013.01);
(Continued)

(58) Field of Classification Search
CPC ........ G06F 21/56; G06F 21/577; G06F 21/71; G06F 21/55; G06F 21/566; G06F 21/567;
(Continued)

(56) References Cited

U.S. PATENT DOCUMENTS 7,617,320 B2 * 11/2009 Alon ...................... H04L 29/06
  707/999.001
9,319,420 B1 * 4/2016 Franke ................ H04L 63/1441
(Continued)

OTHER PUBLICATIONS

M. Qin, W. Hu, D. Mu and Y. Tai, "Property Based Formal Security Verification for Hardware Trojan Detection," 2018 IEEE 3rd International Verification and Security Workshop (IVSW), 2018, pp. 62-67. (Year: 2018).*
(Continued)

*Primary Examiner* — Kari L Schmidt
(74) *Attorney, Agent, or Firm* — Thomas | Horstemeyer, LLP

(57) ABSTRACT

Disclosed are various embodiments for detecting hardware Trojans through information flow security verification. A file comprising register transfer level (HDL) code for an intellectual property core is loaded from memory. An asset within the intellectual property core is identified. An integrity verification or confidentiality verification of the HDL code that represents the asset is performed. An integrity violation or confidentiality violation within the HDL code as a result of performance of the integrity verification or confidentiality violation on the HDL code that represents the asset is detected. A malicious control point or a malicious observation point linked to the asset is identified. Finally, a trigger circuit for a hardware Trojan is identified in response to identification of the malicious control point or malicious observation point.

14 Claims, 6 Drawing Sheets

(51) Int. Cl.
  *G06F 21/57* (2013.01)
  *G06F 21/72* (2013.01)
  *G06F 21/71* (2013.01)
  *G06F 21/55* (2013.01)
  *G06F 21/75* (2013.01)
(52) U.S. Cl.
  CPC .......... *G06F 21/566* (2013.01); *G06F 21/567* (2013.01); *G06F 21/577* (2013.01); *G06F 21/71* (2013.01); *G06F 21/72* (2013.01); *G06F 21/75* (2013.01); *G06F 21/76* (2013.01)
(58) Field of Classification Search
  CPC .......... G06F 21/75; G06F 21/76; G06F 21/72; G06F 21/565; G06F 21/568
  See application file for complete search history.

(56) References Cited

U.S. PATENT DOCUMENTS

| | | | | |
|---|---|---|---|---|
| 10,331,912 | B2* | 6/2019 | Guilley | G06F 21/72 |
| 10,346,571 | B2* | 7/2019 | Darbari | G06F 11/076 |
| 10,409,994 | B1* | 9/2019 | Kammler | G06F 21/577 |
| 10,990,723 | B2* | 4/2021 | Kastner | G06F 30/33 |
| 2011/0113392 | A1* | 5/2011 | Chakraborty | G06F 30/327 |
| | | | | 716/102 |
| 2012/0054511 | A1* | 3/2012 | Brinks | G06F 1/26 |
| | | | | 713/310 |
| 2012/0254830 | A1* | 10/2012 | Conrad | G06F 8/35 |
| | | | | 717/106 |
| 2015/0334133 | A1* | 11/2015 | Schaffner | G06F 21/62 |
| | | | | 726/1 |
| 2016/0098558 | A1* | 4/2016 | Vedula | G06F 21/71 |
| | | | | 726/23 |
| 2016/0098561 | A1* | 4/2016 | Keller | G06F 21/567 |
| | | | | 726/24 |
| 2016/0098565 | A1* | 4/2016 | Vedula | G06F 21/577 |
| | | | | 726/24 |
| 2016/0224407 | A1* | 8/2016 | Rajendran | G06F 11/0706 |
| 2017/0316227 | A1* | 11/2017 | Oberg | G06F 21/85 |
| 2017/0364363 | A1* | 12/2017 | Darbari | G06F 9/3867 |
| 2018/0032745 | A1* | 2/2018 | Kalinin | G06F 3/0481 |
| 2018/0032760 | A1* | 2/2018 | Hu | G06F 21/577 |
| 2019/0108348 | A1* | 4/2019 | Vedula | G06F 21/56 |
| 2019/0180041 | A1* | 6/2019 | Bhunia | G06F 13/28 |
| 2019/0286763 | A1* | 9/2019 | Kastner | G06F 30/327 |
| 2019/0318135 | A1* | 10/2019 | Schat | G01R 31/31703 |
| 2019/0340394 | A1* | 11/2019 | Sinanoglu | G06F 21/72 |

OTHER PUBLICATIONS

Ngo, Xuan Thuy, et al. "Encoding the state of integrated circuits: a proactive and reactive protection against hardware trojans horses." Proceedings of the 9th Workshop on Embedded Systems Security. 2014, pp. 1-10. (Year: 2014).*

A. Dabrowski, H. Hobel, J. Ullrich, K. Krombholz and E. Weippl, "Towards a Hardware Trojan Detection Cycle," 2014 Ninth International Conference on Availability, Reliability and Security, 2014, pp. 287-294, (Year: 2014).*

* cited by examiner

HARDWARE TROJAN DETECTION THROUGH INFORMATION FLOW SECURITY VERIFICATION

BACKGROUND

Today's system-on-chips (SoCs) usually contain multiple intellectual property (IP) cores performing various functions. An IP core is a reusable unit of logic, cell, or integrated circuit that is the intellectual property of one party. An IP core may be licensed to another party or be owned and used a single party alone. IP cores can be used as building blocks for larger and more complex circuits, such as an SoC. Accordingly, an IP core can be viewed as performing the same or similar function in chip design that a software library performs in computer programming or a discrete integrated circuit performs for a printed circuit board design.

To lower research and development (R&D) cost and speed up the development cycle, SoC design houses typically purchase most of the IP cores used for various aspects of an SoC from third-party (3P) vendors. However, this can raise concerns regarding the trustworthiness of third-party intellectual property (3PIP) cores because 3PIP vendors can insert malicious components, known as hardware Trojans, into their IP cores. This issue has gained significant attention as Trojans inserted by a 3PIP core vendor can create backdoors in the design through which sensitive information can be leaked and other possible attacks (e.g., denial of service, reduction in reliability) can be performed.

Detection of Trojans in 3PIP cores is challenging as there is no trusted reference version against which to compare a given IP core during verification. In theory, an effective way to detect a Trojan in an IP core is to activate the Trojan and observe its effects. However, a Trojan's type, size, and location are generally unknown. Likewise, a Trojan's activation condition does not tend to be triggered frequently in order to escape detection. A Trojan can be, therefore, well hidden during the normal functional operation of the 3PIP core supplied as hardware description language (HDL) code, such as register transfer level (RTL) code or similar representations. A large industrial-scale IP core can include thousands of lines of HDL code. Identifying the few lines of HDL code in an IP core that represents a Trojan is an extremely challenging task. Different approaches have been proposed to validate that an IP does not perform any malicious function or contain a Trojan. Existing Trojan detection techniques can be broadly classified into structural and functional analysis, logic testing, formal verification, information flow tracking and runtime validation.

Structural analysis employs quantitative metrics to mark signals or gates with low activation probability as suspicious signals that may be a part of a Trojan. One technique that has been proposed is a technique named unused circuit identification (UCI) to find the lines of HDL code that have not been executed during simulation. These unused lines of codes may be considered to be part of a malicious circuit. However, these techniques do not guarantee Trojan detection and it has been demonstrated that hardware Trojans can be designed to defeat the UCI technique.

Functional analysis based approaches rely on functional simulation to find suspicious regions of an IP core which have characteristics similar to that of a hardware Trojan. One proposed technique is Functional Analysis for Nearly-unused Circuit Identification (FANCI), which flags nets having weak input-output dependency as suspicious. Another technique known as VeriTrust involves identifying nets that are not driven by functional inputs as potential trigger inputs of a hardware Trojan. However, it is known that Trojans can be designed to bypass both of these detection techniques. Another proposed Trojan detection technique is based on symbolic algebra. However, this technique requires a trusted reference of the IP core which may not be available when it is procured from 3PIP core vendors.

Some recent works have utilized formal methods and information flow tracking (IFT) based techniques to detect Trojans. One technique involves formally verifying malicious modification of critical data in 3PIP core by hardware Trojans. Another similar approach involves formally verifying unauthorized information leakage in 3PIP cores. Another technique involves the use of proof-carrying code (PCC) to formally validate the security related properties of an IP core. Commercial tools can identify information leakage caused by design bugs and/or hardware Trojans. However, all of these techniques share some inherent limitations which can be exploited to bypass their detection capabilities.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for detecting hardware Trojans through information flow security (IFS) verification. Violations of IFS policies due to the presence of Trojans can be detected. Once the presence of Trojan is detected, the triggering condition can be extracted. In addition, the various embodiments of the present disclosure can also be used to detect IFS policy violations that are unintentionally introduced by design mistakes or through the use of computer-aided design (CAD) tools.

The IFS verification framework employed by various embodiments of the present disclosure can detect violations of confidentiality and integrity policies caused by a Trojan in an IP core. This approach involves modeling an asset (e.g., a net carrying a secret key) as a fault and leverages an automatic test pattern generation (ATPG) algorithm to detect the propagation of the asset. In some embodiments, a partial-scan ATPF technique may be used to identify the observation or control points through or from which an asset may leak or otherwise be influenced or modified.

Figure 1:
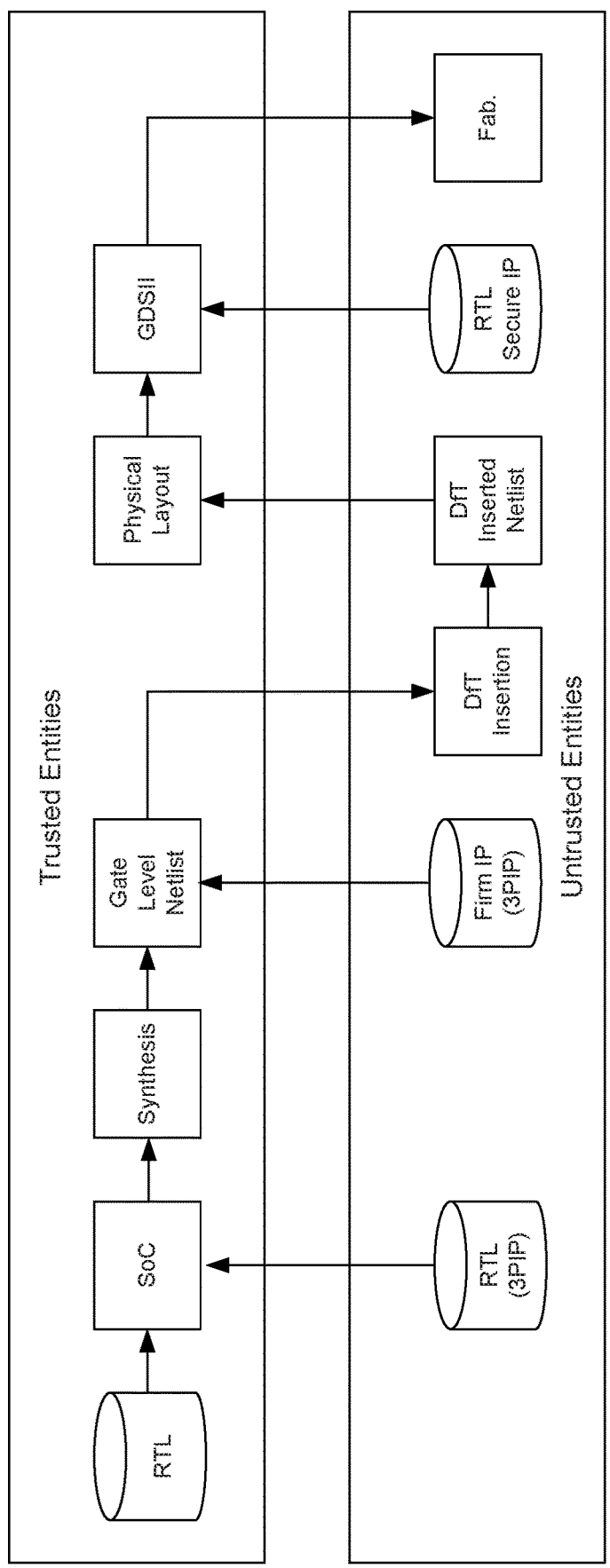
FIG. 1 is a drawing of a design flow for an integrated circuit, such as a system-on-a-chip (SoC).

FIG. 1 shows a typical SoC design flow. In FIG. 1, the steps performed inside the top box in FIG. 1 are considered to be trusted while the steps performed inside the bottom box are considered to be untrusted. Likewise, data from trusted sources is located in the top box while data from untrusted sources is located in the bottom box.

Design specification by the SoC integrator is the first step. The SoC integrator then identifies a list of IP cores necessary to implement the given specification. These IP cores are either developed in-house or purchased from 3PIP core vendors. If purchased, these 3PIP cores can be procured in one or more forms. For example, "soft IP cores" are delivered as synthesizable register transfer level (RTL) code written in a hardware description language (HDL) such as Verilog or VHDL. "Firm IP cores" are delivered as gate level implementation of the IP, possibly using a generic library. "Hard IP cores" are delivered as GDSII representations of a fully placed and routed design.

After developing or procuring all the necessary soft IP cores, the SoC design house integrates them to generate an HDL specification of the whole SoC. The HDL design goes through extensive functional testing to verify the functional correctness of the SoC and also to find any design bugs. The SoC integrator then synthesizes the HDL description into a gate-level netlist based on a target technology library. They may also integrate firm IP cores from a vendor into this netlist at this stage. The SoC integrator then integrates "design for test" (DFT) structures to improve the design's testability. However, in many cases, the DFT insertion is outsourced to third party vendors who specialize in designing test and debug structures. In the next step, the gate-level netlist is translated into a physical layout design. It is also possible to import IP cores from vendors in GDSII layout file format and integrate them at this stage. After performing static timing analysis (STA) and power closure, the SoC integrator generates the final layout in GDSII format and sends it out to a foundry for fabrication.

A hardware Trojan can be implanted in an SoC design in a number of manners. These hardware Trojans may have any number of objectives and capabilities.

As an initial matter, all 3PIP cores should be considered untrusted. The third party vendors involved in the SoC design flow (e.g., design for test (DFT) insertion) are considered untrusted as well. The SoC integrator and the CAD tools can be considered to be trusted entities.

This trust model is based on the assumption that the third-party vendors will insert the Trojans into 3PIP cores while the SoC integrator will try to detect them. SoC integrator is presumed to have black box knowledge of the functionality of the IP cores purchased from the third party vendors. That is, the SoC integrator only has the knowledge of the high-level functionality of the IP cores. The 3PIP core vendors have full control over their IP and can insert stealthy Trojans which would be extremely difficult, if not impossible, to detect using traditional test and verification techniques. The other important players in SoC design include DFT vendors who have access to the whole SoC design and have the capability to incorporate stealthy malicious circuitry in the SoC. 3PIP core vendors and DFT vendors may have the goal to implant a Trojan in the SoC design through which sensitive information can be leaked and other possible attacks (e.g., denial of service, reduction in reliability, etc.) can be performed.

The basic structure of a hardware Trojan in a 3PIP core can include two main parts: a trigger and a payload. A Trojan trigger is an optional part that monitors various signals, events, or a series of events in the SoC. Once the trigger detects an expected event or condition, the payload is activated to perform a malicious behavior. Typically, the trigger is expected to be activated under extremely rare conditions, so that the payload remains inactive most of the time in order to avoid detection. When the payload is inactive, the SoC acts like a Trojan free circuit, making it difficult to detect the Trojan.

A Trojan can have a variety of possible payloads. For example, a Trojan may cause an SoC to leak secret information (violation of confidentiality). As another example, a Trojan may allow for an adversary to gain unauthorized access to a system or escalate an authorized level of access to an unauthorized level (violation of integrity). Most, Trojan payloads will violate either or both of the confidentiality and the integrity policies of the SoC.

There are also several types of Trojans. One type of Trojan, referred to as a "Type I Trojan," delivers its payload through the valid asset propagation path. For example, the RSA-T100 Trust-Hub Trojan leaks the private key through a valid ciphertext output port. Type I Trojans generally create a bypass path and allows an adversary to extract the asset. Another type of Trojan, referred to as a "Type II Trojan," delivers its payload through a malicious circuit which is not authorized to observe or control the asset. For example, the AES-T100 Trust-Hub Trojan leaks the private key through a leakage circuit which is functionally isolated from the valid encryption logic.

The various embodiments of the present disclosure can use a detection framework 213 that is based on information flow security (IFS) verification which detects violation of IFS policies due to Trojans. This framework can be applied to a synthesized gatelevel netlist of a design. To detect Trojans using the detection framework 213, a SoC integrator can first synthesize the 3PIP core to get the gate-level netlist and then apply the detection framework 213. The detection framework 213 is based on the observation that a Trojan, however small, will alter the normal information flow of a design and thereby violate information flow security (IFS) policies.

The detection framework 213 is based on the concept of modeling an asset (e.g., a net carrying a secret key) as a stuck-at-0 and a stuck-at-1 fault and leveraging an automatic test pattern generation (ATPG) algorithm to detect the faults. A successful detection of faults means that the logical value of the asset carrying net can be observed through the observation points or the logical value of the asset can be controlled by the control points. In other words, there exists information flow from asset to observation points or from control points to asset. Here, the observation points refer to any primary or pseudo-primary outputs that can be used to observe internal signals and the control points refer to the primary or pseudo-primary inputs that can be used to control internal circuit signals.

For the detection framework 213, all observation points through which an asset can be observed and identify all control points from which an asset can be controlled should be identified. A partial-scan ATPF technique can be used to identify the observation and control points of an asset. In a partial-scan ATPF design, the scan chains contain some, but not all, of the sequential cells in the design. Traditionally, partial-scan is used to minimize area overhead (caused by a DFT structure) while attaining targeted test coverage. However, in the detection framework 213, the partial-scan ATPG can be used to identify the observation points through which an asset can be observed and identify the control points from which an asset can be controlled.

Figure 2:
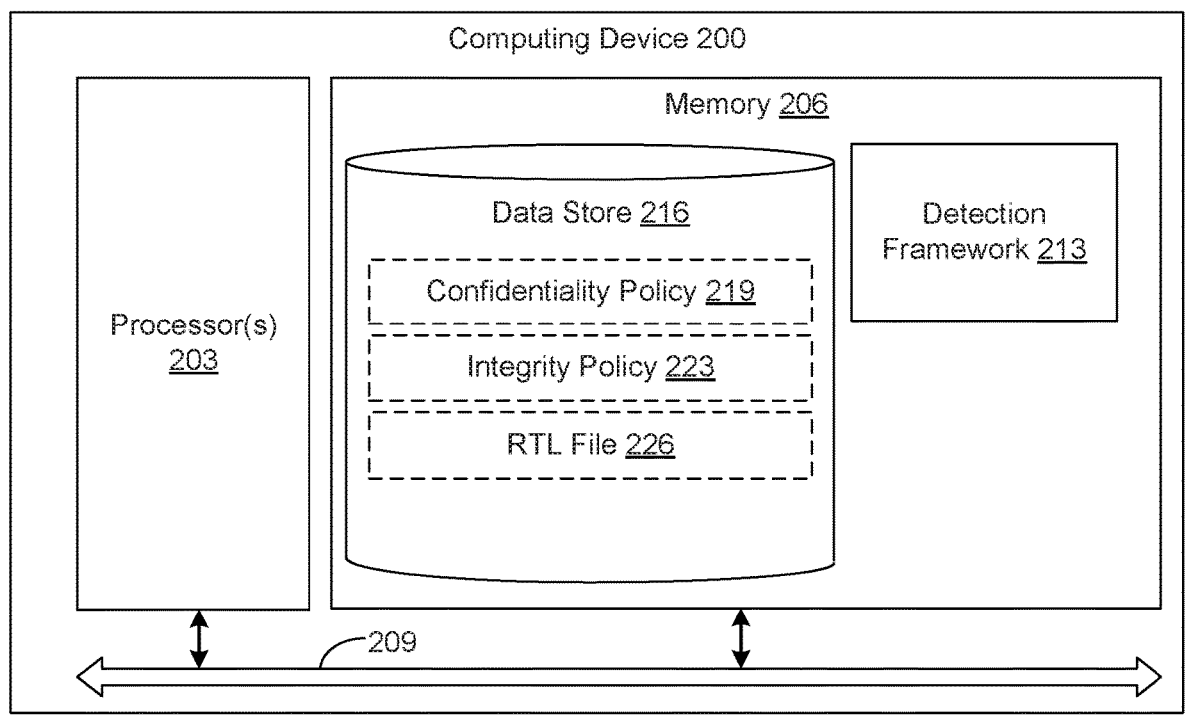
FIG. 2 is a schematic block diagram of a computing device for implementing the functionality provided by the various embodiments of the present disclosure.

FIG. 2 depicts a schematic block diagram of a computing device 200 that can be used to implement various embodiments of the present disclosure. Each computing device 200 includes at least one processor circuit, for example, having a processor 203 and a memory 206, both of which are coupled to a local interface 209. To this end, each computing device 200 may comprise, for example, at least one server computer or like device. The local interface 209 may comprise, for example, a data bus with an accompanying address/control bus or other bus structure as can be appreciated.

Stored in the memory 206 are both data and several components that are executable by the processor 203. In particular, stored in the memory 206 and executable by the processor 203 are a detection framework 213 203, and potentially other applications. Also stored in the memory 206 may be a data store 216 and other data. The data store 216 can include one or more confidentiality policies 219, one or more integrity policies 223, one or more HDL files 226, and potentially other data. In addition, an operating system may be stored in the memory 206 and executable by the processor 203.

The detection framework 213 can be executed to perform an information flow security verification on an intellectual property core 226 or portions of an HDL file 226. For example, the detection framework 216 can be executed to determine whether the HDL file 226 complies with a confidentiality policy 219. As another example, the detection framework 216 can be executed to determine whether the HDL file 226 complies with an integrity policy 223.

A confidentiality policy 219 can represent a policy for determining whether a particular asset of an intellectual property core is correctly handling data. For example, the confidentiality policy 219 can specify which gates, registers, ports, or other input/output mechanisms or observation points are permitted to be used to access a particular asset. For instance, the confidentiality policy 219 may specify the observation points which can be used for reading a cryptographic key, a password, or other access restricted data. A confidentiality policy 219 may be specific to a particular type of data or a particular HDL File 226.

An integrity policy 223 can represent a policy for determining whether a particular asset of an intellectual property core is correctly controlling or manipulating data. For example, the integrity policy 219 can specify which gates, registers, ports, or other input/output mechanisms are permitted to be used to write, edit, or otherwise manipulate a particular asset. For instance, the integrity policy 219 may specify the control points which can be used for storing, copying, or transmitting a cryptographic key to another process, device, or drive. An integrity policy 223 may be specific to a particular type of data or a particular HDL File 226.

An HDL File 226 can specify the functionality of an integrated circuit and may be developed using a high-level hardware description language (e.g., Verilog or VHDL). For example, the HDL File 226 can define the functionality of of an application specific integrated circuit (ASIC), a network interface (e.g., a wireless radio for BLUETOOTH, WI-FI, or cellular communication), a central processing unit, a coprocessor (e.g., a motion or audio coprocessor), or other circuit. Individual functions, data structures, and other logical blocks of the intellectual property core represented by the HDL File 226 may be referred to or represented as assets of the intellectual property core represented by the HDL File 226.

It is understood that there may be other applications that are stored in the memory 206 and are executable by the processor 203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 206 and are executable by the processor 203. In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, source code that may be expressed in proper format such as object code that is capable of being loaded into a random access portion of the memory 206 and executed by the processor 203, or source code that may be interpreted by another executable program to generate instructions in a random access portion of the memory 206 to be executed by the processor 203, etc. An executable program may be stored in any portion or component of the memory 206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 206 is defined herein as including both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 203 may represent multiple processors 203 and/or multiple processor cores and the memory 206 may represent multiple memories 206 that operate in parallel processing circuits, respectively. In such a case, the local interface 209 may be an appropriate network that facilitates communication between any two of the multiple processors 203, between any processor 203 and any of the memories 206, or between any two of the memories 206, etc. The local interface 209 may comprise additional systems designed to coordinate this communication, including, for example, performing load balancing. The processor 203 may be of electrical or of some other available construction.

Although the detection framework 213 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the detection framework 213, that comprises software or code can be embodied in any non-transitory computer-readable medium for use by or in connection with an instruction execution system such as, for example, a processor 203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the detection framework, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 200, or in multiple computing devices in the same computing environment 103. Additionally, it is understood that terms such as "application," "service," "system," "engine," "module," and so on may be interchangeable and are not intended to be limiting.

Figure 3:
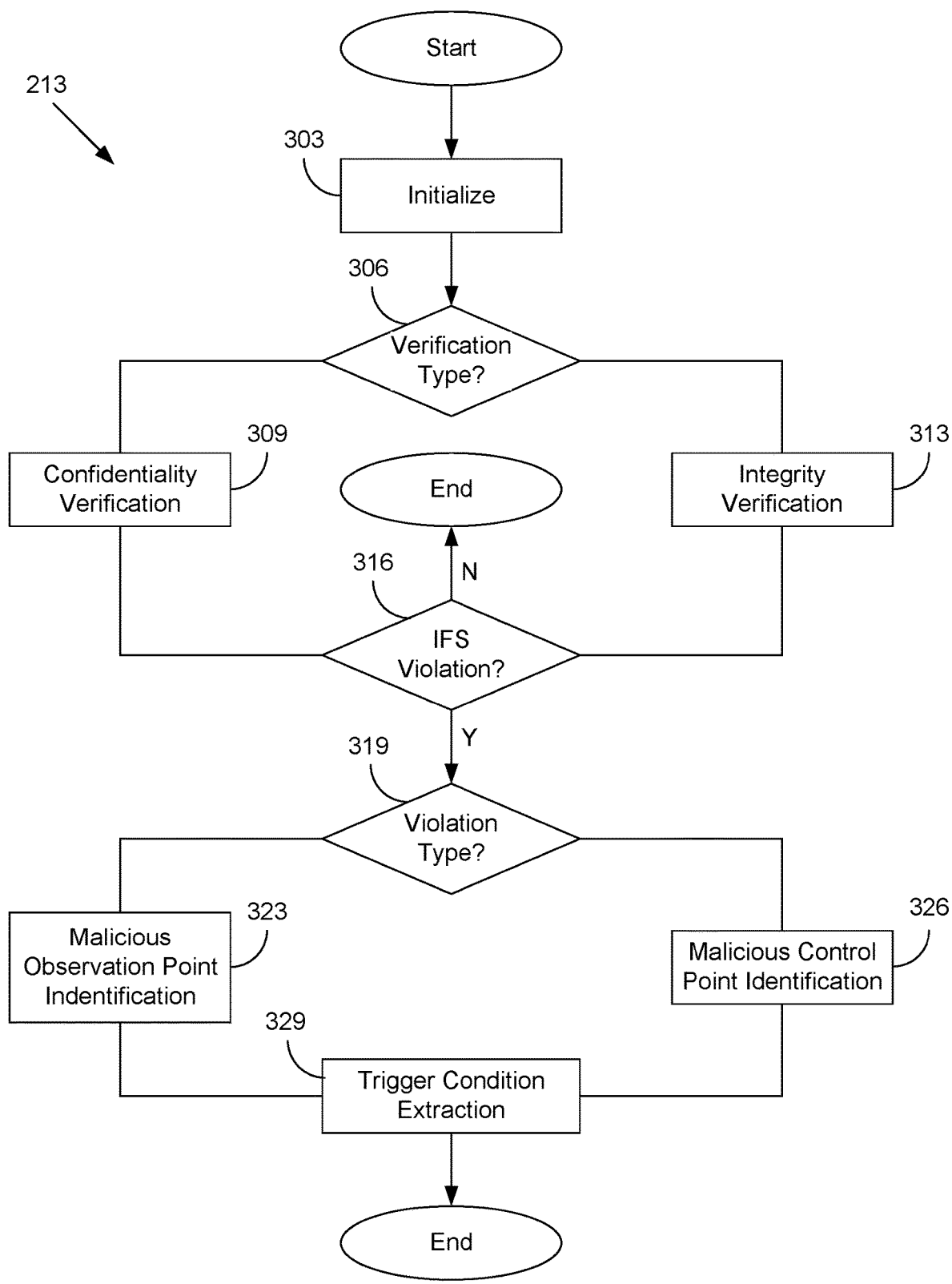
FIG. 3 is a flowchart illustrating one example of functionality implemented according to various embodiments of the present disclosure.

FIG. 3 depicts a flowchart that provides one example of the operation of a portion of an application implementing an embodiment of the present disclosure. It is understood that the flowchart of FIG. 3 provides merely an example of the many different types of functional arrangements that may be employed to implement the operation of various embodiments of the present disclosure. As an alternative, the flowchart of FIG. 3 may be viewed as depicting an example of elements of a method implemented in a computing device according to one or more embodiments.

FIG. 3 shows an overview of the detection framework 213 for Trojan detection. The illustrated techniques can detect one or more Trojans inserted by 3P IP core and DFT vendors. The detection framework 213 can be further classified as providing Confidentiality Verification and Integrity Verification. In Confidentiality Verification, all the observation points through which an asset can be observed are analyzed. It can then be determined if the asset can be observed through any unauthorized or malicious observation points. Similarly, in Integrity Verification, the detection framework 213 can determine if an asset can be controlled by any unauthorized or malicious control points. Authorized and unauthorized observation or control points can be identified using various identification technique. Once a verification failure is identified, a trigger condition extraction technique can be used to extract the triggering condition of the Trojan.

Beginning at box 303, the detection framework 213 is initialized. As part of the initialization process, one or more parameters may be provided to the detection framework 213. This can include a specification of the HDL File 226 to be analyzed, the type of analysis to be performed, one or more polices to be considered, and potentially other parameters.

Moving on to box 306, the type of IFS verification to be performed is determined. For example, based on one or more of the parameters specified previously at box 303, the detection framework 213 may determine that a confidentiality verification is to be performed. As another example, the detection framework 213 may determine that an integrity verification is to be performed based on one or more of the parameters specified previously at box 303.

If confidentiality verification is selected, the process proceeds to box 309. Here, confidentiality verification is performed according to a confidentiality policy 219. The confidentiality policy 219 ensures that the information from a classified system never leaks to an unclassified one. For example, a secret key for data encryption should never flow to an unclassified domain. A violation of the confidentiality policy 219 indicates that an asset can be leaked through an observation point which is accessible to an attacker. In Confidentiality verification, all the observation points through which an asset can be observed are identified and analyzed to determine if the asset can be observed through any unauthorized observation points.

Figure 4:
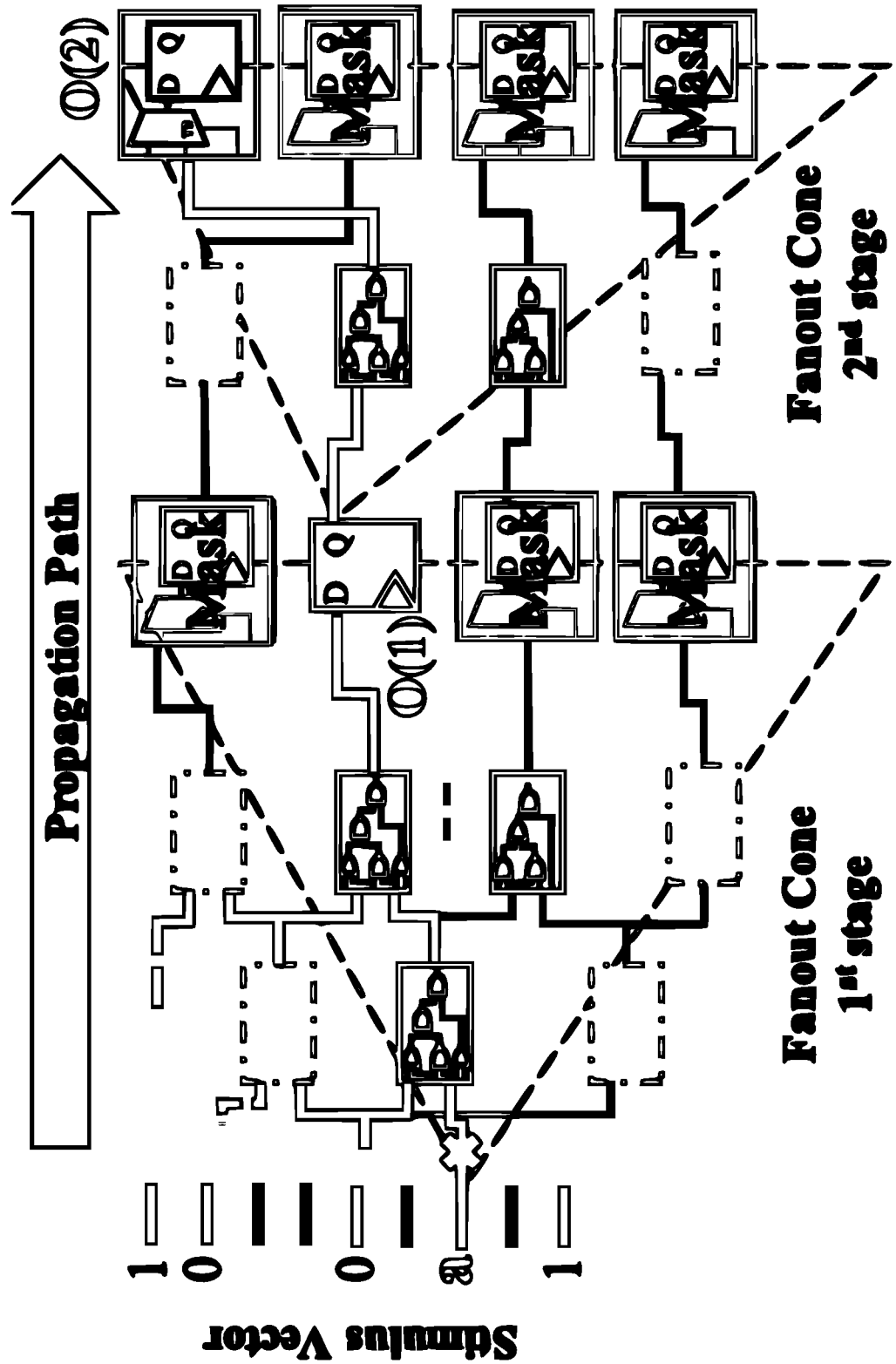
FIG. 4 is a depiction of an example of the confidentiality verification algorithm utilizing a partial scan ATPG to identify the observation points through which an asset can be observed.

The confidentiality verification process is illustrated in FIG. 4 and by the following pseudo-code:

```
1:   procedure CONFIDENTIALITY VERIFICATION
2:   Input: Asset, gate-level netlist, technology library
3:   Output: Observe points, asset propagation path, stimulus vector
4:       FF_level ← 1
5:       add_scan_ability(all_register)
6:       for all a ∈ Asset do
7:           FanoutFinal ← fanout(a , endpoints_only)
8:           mask_register(FanoutFinal)
9:           while 1 do
10:              for all FO ∈ FanoutFinal do
11:                  unmask_register(FO)
12:                  add_Faults(a , "stuck - at")
13:                  run_sequential_ATPG
14:                  analyze_Faults(a , "stuck - at 0")
15:                  analyze_Faults(a , "stuck - at 1")
16:                  if detected faults > 1 then
17:                      append ObsPoints ← FO
18:                      Report : propagationpath(a ,
```

```
                    FO),controlsequence
19:                 append
                    FanoutTemp←fanout(FO,endpoints_only)
20:                 remove_scan_ability(FO)
21:                 mask_register(FO)
22:             end if
23:         end for
24:         if FanoutTemp is not empty then
25:             FanoutFinal ← FanoutTemp
26:             FF_level++
27:         else
28:             break
29:         end if
30:     end while
31:   end for
32: end procedure
```

The detection framework 213 first takes an asset (name of the port or net where the asset is located), the gate-level netlist of the design, and the technology library (required for ATPG analysis) as inputs (Line 2). Then, the detection framework 213 adds a scan capability to all the flip-flops (FFs) in the design to make them controllable and observable (see line 5). For each asset a ∈ Asset, the detection framework 213 finds the observation points (primary output or scan FFs) in the fan-out cone of a (Line 7). The algorithm then adds capture masks in these FFs (Line 8) so asset propagation to any observation point can be individually tracked. Next, for each observation point FO, the detection framework 213 removes the mask (Line 11) so that propagation of asset a to FO can be detected. Asset a is added (Line 12) as the only stuck-at fault in the design. Lines 13-15 use ATPG algorithm in the sequential mode to find paths to propagate a=0 and a=1 to observation point FO. If both, a=0 and a=1 is detected from FO (Line 16), then there exists an information flow from a to FO and the algorithm marks FO as an observation point and reports the propagation path from a to FO as well as the control sequence or stimulus required for the asset propagation (Line 17-18). Next, the detection framework 213 finds the next level observation points by analyzing the fan-out cone of FO (Line 19). Also, the scan ability is removed from FO, thereby allowing the asset to propagate to next level observation points through FO using sequential ATPG (Line 20). This process continues until a level of observation point is reached where all the observation points are primary outputs or the sequential ATPG algorithm cannot generate patterns to propagate the fault to observation point (Line 24-28). The output produced by the detection framework 213 at box 309 is the list of observation points and the propagation path along with the stimulus vector for asset propagation for each of the observation points. Execution then proceeds to box 316.

However, if the integrity verification is selected, the process proceeds to box 313. At box 313, integrity verification is performed according to an integrity policy. The integrity policy ensures that an untrusted system should never influence a trusted one. For example, an untrusted control point (e.g., a register), should never be able to influence a control pin of a trusted system. A violation of the integrity policy indicates that an asset can be influenced by control points which are accessible to an attacker. In Integrity Verification, the control points through which an asset can be controlled are identified and analyzed to determine if the asset can be influenced by any unauthorized control points.

Figure 5:
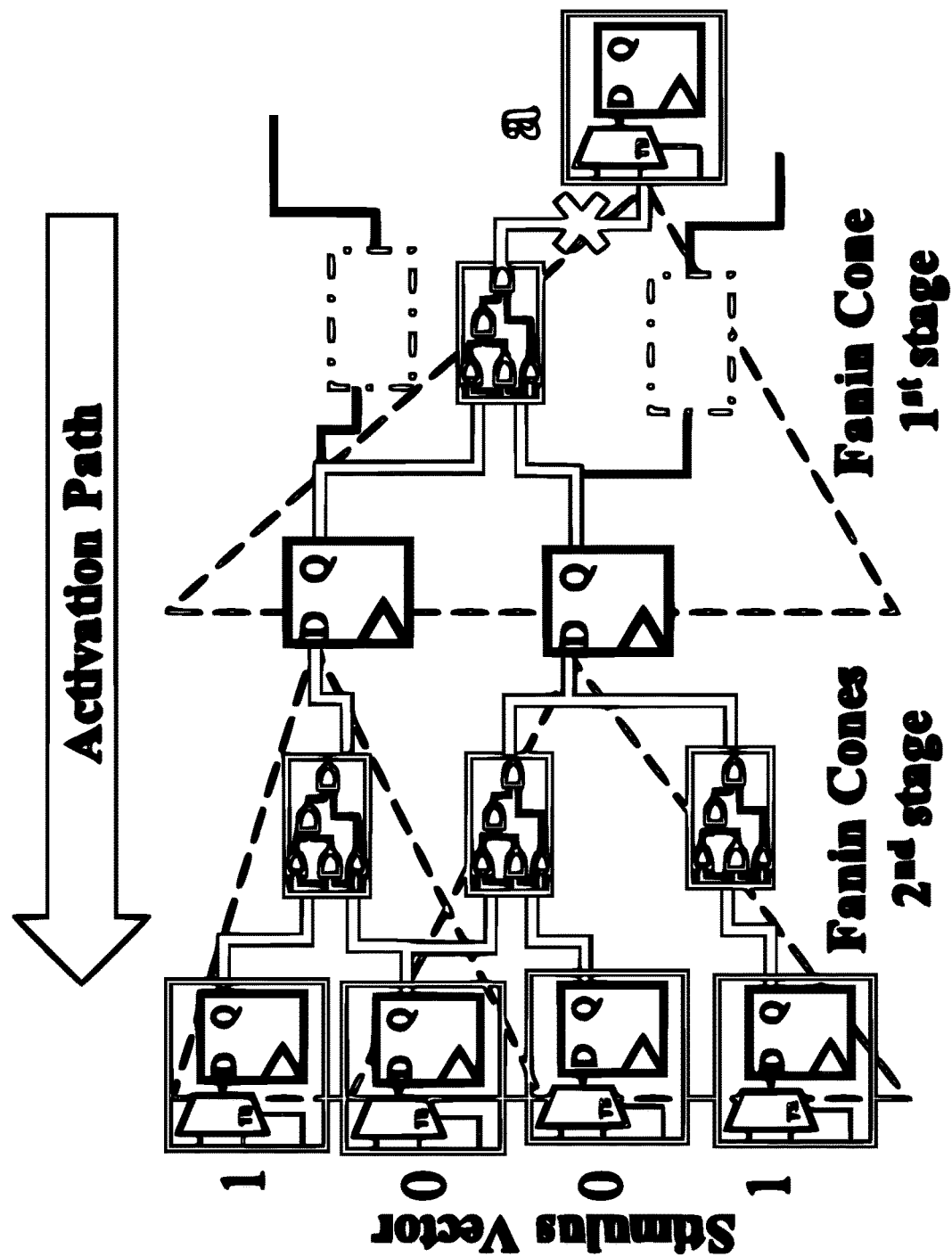
FIG. 5 is a depiction of an example of the integrity verification algorithm utilizing partial-scan ATPF to identify all control points from which an asset can be influenced.

The integrity verification process is illustrated in FIG. 5 and by the following pseudo-code:

```
1:  procedure INTEGRITY VERIFICATION
2:  Input: Asset, gate-level netlist, technology library
3:  Output: Control points, asset activation path, stimulus vector
4:      FF_level ← 1
5:      add_scan_ability(all_register)
6:      for all a ∈ Asset do
7:          FaninFinal ← fanin(a , startpoints_only)
8:          while 1 do
9:              add_Faults(a , "stuck - at")
10:             run_sequential_ATPG
11:             analyze_Faults(a , "stuck - at 0")
12:             analyze_Faults(a , "stuck - at 1")
13:             if detected faults > 1 then
14:                 for all FI ∈ FaninFinal do
15:                     append ControlPoints ← FI
16:                     Report : controlpath(a), controlsequence
17:                     append
                        FaninTemp←fanin(FI,startpoints_only)
18:                     remove_scan_ability(FI)
19:                 end for
20:             end if
21:             if FaninTemp is not empty then
22:                 FaninFinal ← FaninTemp
23:                 FF_level++
24:             else
25:                 break
26:             end if
27:         end while
28:     end for
29: end procedure
```

The detection framework 213 first takes an asset (name of the register where the asset is located), the gatelevel netlist of the design, and the technology library (required for ATPG analysis) as inputs (Line 2). Then, the detection framework 213 adds scan capability to all the FFs in the design to make them controllable and observable (see line 5). Now, for each asset a ∈ Asset, the detection framework 213 finds the control points (FaninFinal) in the fan-in cone of a (Line 7). Line 9 of the detection framework 213 adds asset a as the only stuck-at fault in the design. Lines 9-12 use ATPG techniques in the sequential mode to activate the fault. A successful detection of a fault indicates that there exists information flow FaninFinal to a (Line 13). Now for each FI∈FaninFinal, the detection framework 213 marks the FI list as a control point and reports the activation path from FI to a as well as the control sequence or stimulus required to activate the faults (Line 15-16). Next, the detection framework 213 finds the previous level control points by analyzing the fan-in cone of FI (Line 17). Also, the scan ability is removed from FI and thereby allowing the asset to be controlled by previous level control points (Line 18). This process continues until a level is reached where all the control points are primary inputs or the sequential ATPG algorithm cannot generate patterns to activate the faults from the control points (Line 21-25). The output of the detection framework 213 is the list of control points and the activation path along with the stimulus vector for asset activation. Execution then proceeds to box 316.

At box 316, a determination is made as to whether an IFS violation occurred. If an IFS violation occurred, then the detection framework 213 proceeds to box 319. If an IFS violation did not occur, then the process ends.

Subsequently at box 319, the type of violation that occurred is determined. For example, if the violation represents a violation of a confidentiality policy 219, then it may be concluded that a confidentiality violation has occurred. Likewise, if the violation represents a violation of an integrity policy 223, then it may be determined If the type of violation that occurred is a confidentiality violation, the process proceeds to box 323. At box 323, the detection framework 213 performs a malicious observation point identification process. Although the observation points through which an asset can be observed were identified by the detection framework 213 at box 309, valid or authorized observation points need to be distinguished from malicious observation points in order to detect the presence of a hardware Trojan.

As previously discussed, Type I Trojans leak the asset through valid observation points by creating bypass paths for asset leakage. This type of Trojan can be detected by analyzing the asset propagation path reported at box 309. The propagation path report specifies a propagation depth, which represents the total number of gates an asset defined in the HDL file 226 propagates through before reaching the observation points. The propagation depth for the Trojan bypass path will be much less than the propagation depth of a valid propagation path. While an attacker could add redundant logic to make the propagation depth of the leakage path equal to the propagation depth of the valid path, the various embodiments of the present disclosure operate on the synthesized netlist. Because the synthesis process will automatically remove any redundant logic, the propagation depth of the leakage path should normally be less than the propagation depth of the valid path. Also, by analyzing the propagation path, the type of operations (e.g., and, or, xor) an asset goes through before propagating to an observation point can be identified.

Now, a Type II Trojan leaks the asset through a leakage circuit which is functionally separated from the logic which is authorized to handle the asset. The observation points associated with the leakage circuit can be distinguished through the use of an Intersect Analysis. In this analysis, all the fan-in elements of the valid observation points are recorded. For example, in an encryption module ciphertext output ports are the valid observation points. If any FF is found which can observe the asset but is not located in the fan-in cone of the ciphertext output ports then it can be concluded that the key can be leaked to an observation point which is not part of the encryption logic. In other words, there exists a violation of confidentiality policy in the given design.

Figure 6:
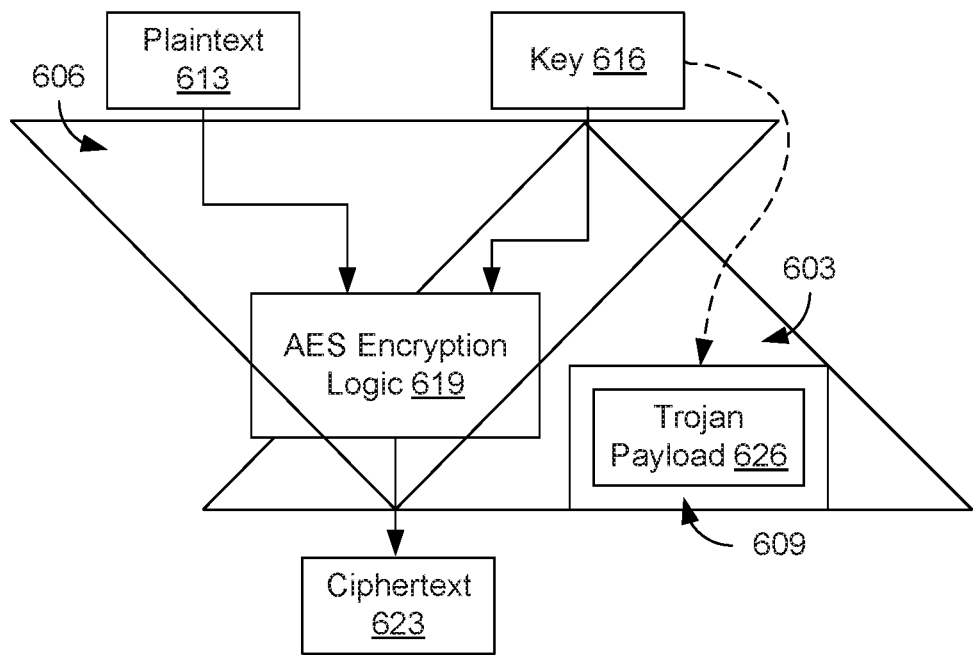
FIG. 6 depicts an example of the intersect analysis used in various embodiments of the present disclosure.
Figure 6:
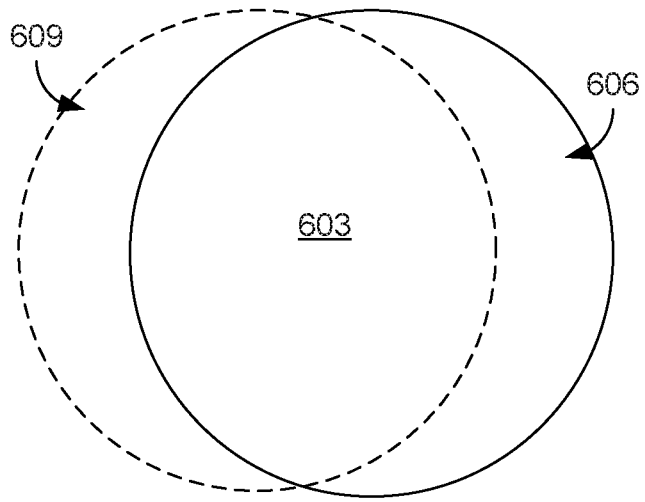

FIG. 6 depicts an example of the intersect analysis. Region 603 represents all observation points where an Asset can propagate to and Region 606 represents all the fan-in elements of valid observation points (e.g., a ciphertext output port). Region 609 represents the malicious observation points.

For example, if a plaintext asset 613 and a cryptographic key asset 616 were to be processed by an advanced encryption standard (AES) encryption logic 619 to generate a ciphertext asset 623, it would be expected that the valid propagation path of the plaintext asset 613 and the cryptographic key asset 616 would pass through the intersection of regions 603 and 606. However, if the key were to be leaked by a hardware Trojan payload 626, a second separate propagation path would be expected to proceed through regions 603 and 609. Accordingly, valid propagation path for the key 616 would be expected to occur in the intersection of regions 603 and 606, while an invalid propagation path corresponding to the hardware Trojan payload 626 would be expected to have a propagation path occurring in the intersection of regions 603 and 609.

However, if the type of violation that occurred is an integrity violation, then the detection framework 213 proceeds to box 326. At box 326, the detection framework 213 performs a malicious control point identification process. Although the control points which influences an asset were identified by the detection framework 213 at box 313, valid or authorized control points need to be distinguished from malicious control points in order to detect the presence of a hardware Trojan.

The Type I Trojan can be detected by analyzing the depth of asset activation path. The depth for the Trojan path will be much less than the depth of valid asset activation path. The Type II Trojan can be detected using an Intersect Analysis in a manner similar to that used to identify malicious observation points when a confidentiality analysis is performed. Here, all the fan-out elements of the valid control points are recorded. For example, if the program counter (PC) of a microprocessor is considered as an asset then the valid control point or PC will be the pipeline register in the instruction decode stage. If any FF is found which can control the asset but is not located in the fan-out of PC then it can be concluded that there exists a violation of integrity policy.

Moving to box 329, the input sequence which triggers the identified Trojan is identified and extracted from the HDL file 226 representing the intellectual property core.

As previously discussed, the confidentiality verification process reports the stimulus vector which causes an asset to propagate to a malicious observation point whereas the integrity verification process reports the stimulus vector which creates an activation path from a malicious control point to the asset. For some Trojans, the triggering sequence can be directly extracted from the stimulus vector. For example, the RSA-T100 Trojan monitors a particular plaintext to trigger its functionality. As another example, the AES-T900 triggers after a certain clock cycle. These triggering conditions are relatively simple and can be directly extracted from the stimulus vector. However, there are Trojans (e.g., AES-T1100), where the trigger circuit is composed of a finite state machine (FSM) and triggers when a sequence of plaintext is observed. The stimulus vector generated by IFS framework will report the register values of a Trojan trigger circuit which violates IFS policies. However, it will not report the functional input sequences which will cause the Trojan trigger circuit to activate.

To extract the triggering condition for Trojans like the AES-T1100 Trojan, the detection framework 213 can determine if the registers associated with Trojan trigger circuit are part of an FSM. If the output of a register feeds back to its input through a series of combinational circuits, then it is a potential state register. The reason is that the next state of any FSM depends on the present state of the FSM. As a result, any state register will have a feedback loop. Once the state registers are identified, an FSM extraction technique can be employed to retrieve the functionality of the FSM. This FSM extraction technique determines the present states and input conditions which cause a transition to a particular state and repeats this process to extract the state transition graph (STG) of the overall FSM. Various embodiments of the present disclosure can use this technique to extract the present states and input conditions which cause a transition to a state that activates the trigger circuit. The process can be repeated to generate the STG of the overall FSM. From the STG, the sequence of input patterns which triggers the Trojan can be extracted.

The flowchart of FIG. 3 shows the functionality and operation of an implementation of portions of the detection framework 213. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 203 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
    a computing device comprising a processor and a memory; and
    machine readable instructions stored in the memory that, when executed by the processor, cause the computing device to at least:
        load a file comprising hardware description language (HDL) code for an intellectual property core;
        identify an asset within the intellectual property core;
        perform a confidentiality verification of the HDL code that represents the asset;
        detect a confidentiality violation within the HDL code as a result of performance of the confidentiality verification on the HDL code that represents the asset, wherein the confidentiality violation is defined by a confidentiality policy that specifies which gates, registers, or ports are permitted to be used to access the asset;
        identify a malicious observation point linked to the asset based at least in part on determining a depth of a propagation path of the asset to the malicious observation point and determining whether the malicious observation point is present outside of at least one fan-in cone of at least one respective valid observation point, wherein the malicious observation point indicates a presence of a hardware Trojan;
        determine that a state register linked to the malicious observation point comprises a feedback loop;
        identify a trigger circuit for the hardware Trojan in response to identification of the malicious observation point based at least in part on determining a present state and an input condition that cause a transition of a finite state machine to a state that activates the trigger circuit, the finite state machine comprising the state register linked to the malicious observation point; and
        initiate extraction of the trigger circuit for the hardware Trojan.

2. The system of claim 1, wherein the machine readable instructions further cause the computing device to at least determining whether the malicious observation point is present outside of the at least one fan-in cone of the at least one respective observation point by performing an intersect analysis of the at least one fan-in cone of the at least one respective observation point and all observation points to which the asset can propagate.

3. The system of claim 1, wherein the machine readable instructions further cause the computing device to at least retrieve functionality of the finite state machine linked to the state register.

4. The system of claim 1, wherein the machine readable instructions further cause the computing device to at least identify a trigger condition for the trigger circuit for the hardware Trojan.

5. The system of claim 1, wherein the HDL code is represented as Verilog code.

6. A system, comprising:
    a computing device comprising a processor and a memory; and
    machine readable instructions stored in the memory that, when executed by the processor, cause the computing device to at least
        load a file comprising hardware description language (HDL) code for an intellectual property core;
        identify an asset within the intellectual property core;
        perform an integrity verification of the HDL code that represents the asset;
        detect an integrity violation within the HDL code as a result of performance of the integrity verification on the HDL code that represents the asset, wherein the integrity violation is defined by an integrity policy that can specify which gates, registers, or ports are permitted to manipulate the asset;
        identify a malicious control point linked to the asset based at least in part on determining a depth of a propagation path of the asset to the malicious control point and determining whether the malicious control point is present outside of at least one fan-in cone of at least one respective control point, wherein the malicious control point indicates a presence of a hardware Trojan;
        determine that a state register linked to the malicious control point comprises a feedback loop;
        identify a trigger circuit for the hardware Trojan in response to identification of the malicious control point based at least in part on determining a present state and an input condition that cause a transition of a finite state machine to a state that activates the trigger circuit, the finite state machine comprising the state register linked to the malicious control point; and
        initiate extraction of the trigger circuit for the hardware Trojan.

7. The system of claim 6, wherein the machine readable instructions further cause the computing device to at least determine whether the malicious control point is present outside of the at least one fan-in cone of the at least one respective control point by performing an intersect analysis of the at least one fan-in cone of the at least one respective control point and all control points that can influence the asset.

8. The system of claim 6, wherein the machine readable instructions further cause the computing device to at least retrieve functionality of the finite state machine linked to the state register.

9. The system of claim 6, wherein the machine readable instructions further cause the computing device to at least identify a trigger condition for the trigger circuit for the hardware Trojan.

10. The system of claim 6, wherein the HDL code is represented as Verilog code.

11. A method, comprising:
 loading a file comprising hardware description language (HDL) code for an intellectual property core;
 identifying an asset within the intellectual property core;
 performing an integrity verification of the HDL code that represents the asset;
 detecting an integrity violation within the HDL code as a result of performance of the integrity verification on the HDL code that represents the asset, wherein the integrity violation is defined by an integrity policy that can specify which gates, registers, or ports are permitted to manipulate the asset;
 identifying a malicious control point linked to the asset based at least in part on determining a depth of a propagation path of the asset to the malicious control point and determining whether the malicious control point is present outside of at least one fan-in cone of at least one valid control point, wherein the malicious control point indicates a presence of a hardware Trojan;
 determining that a state register linked to the malicious control point comprises a feedback loop;
 identifying a trigger circuit for the hardware Trojan in response to identification of the malicious control point based at least in part on determining a present state and an input condition that cause a transition of a finite state machine to a state that activates the trigger circuit, the finite state machine comprising the state register linked to the malicious control point; and
 initiate extraction of the trigger circuit for the hardware Trojan.

12. The method of claim 11, further comprising determining whether the malicious control point is present outside of the at least one fan-in cone of the at least one valid control point by performing an intersect analysis of at least one fan-in cone of the at least one valid control point and all control points to which can influence the asset.

13. The method of claim 11, further comprising retrieving functionality of the finite state machine linked to the state register.

14. The method of claim 11, further comprising identifying a trigger condition for the trigger circuit for the hardware Trojan.

* * * * *